United States Patent [19]

Fuss et al.

[11] Patent Number: 5,530,508
[45] Date of Patent: Jun. 25, 1996

[54] DEPLOYABLE CAMERA CHAMBER FOR RECEIVING AND CENTERING A FILM CARTRIDGE

[75] Inventors: Timothy J. Fuss, Rochester; Robert L. Kuhn, Jr., Rush, both of N.Y.

[73] Assignee: Eastman Kodak Company, Rochester, N.Y.

[21] Appl. No.: 334,289

[22] Filed: Nov. 4, 1994

[51] Int. Cl.$^6$ .................................................. G03B 1/00
[52] U.S. Cl. ........................................ 354/212; 354/288
[58] Field of Search ................................ 354/174, 175, 354/173.1, 212, 213, 214, 215, 275, 281, 288

[56] References Cited

U.S. PATENT DOCUMENTS

| | | | |
|---|---|---|---|
| 1,389,164 | 8/1921 | Roikjer | 354/212 |
| 2,771,825 | 11/1956 | Naumann | 354/212 |
| 4,149,793 | 4/1979 | Date | 354/214 |
| 4,363,547 | 12/1982 | Hashimoto | 354/212 |
| 5,049,914 | 9/1991 | Dassero | 354/288 |
| 5,105,211 | 4/1992 | Kameyama | 354/173.1 |
| 5,142,316 | 8/1992 | Tanii et al. | 354/212 |
| 5,155,514 | 10/1992 | Tamamura | 354/174 |
| 5,159,365 | 10/1992 | Takahashi et al. | 354/21 |
| 5,179,402 | 6/1993 | Komatsuzaki et al. | 354/212 |
| 5,231,438 | 7/1993 | Smart | 354/281 |

*Primary Examiner*—Howard B. Blankenship
*Attorney, Agent, or Firm*—Peter J. Bilinski; Joseph F. Breimayer

[57] ABSTRACT

An improved film cartridge handling mechanism for effecting end-wise loading of a film cartridge into a deployable film loading chamber of a camera and positioning of the filmstrip with respect to the camera transport path. The side pivoting, deployable film loading chamber positively seats and accurately aligns the film cartridge in reference to a datum axis as the film loading chamber is latched closed. In use of the invention with a thrust style film cartridge, the seating of the cartridge in the film loading chamber also aligns the film cartridge door with the camera filmstrip transport path. Upon movement of the film loading chamber to the latched or closed position, the film door is opened and the film cartridge spool is engaged with a filmstrip advance motor drive mechanism to advance the aligned filmstrip into the filmstrip transport path and to rewind the filmstrip after all exposures are made.

12 Claims, 6 Drawing Sheets

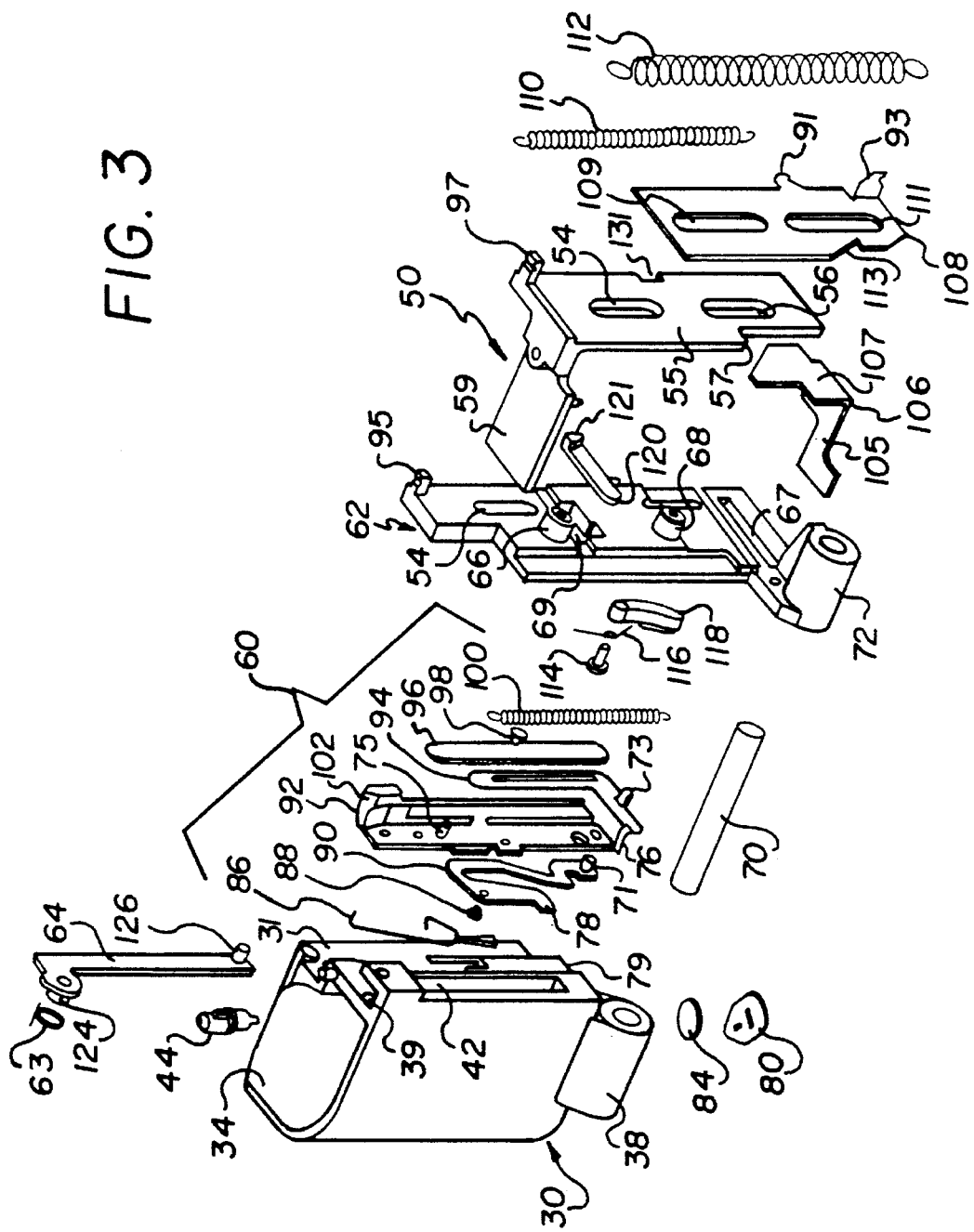

DEPLOYABLE CAMERA CHAMBER FOR RECEIVING AND CENTERING A FILM CARTRIDGE

CROSS-REFERENCE TO RELATED APPLICATIONS

Reference is made to the following commonly assigned, co-pending patent applications including: Ser. No. 075,969, filed Jun. 11, 1993, by Lawther et al., entitled APPARATUS FOR CONTROLLING THE MOVEMENT OF A FILM CARTRIDGE FROM A LOADING CHAMBER IN A CAMERA; Ser. No. 072,619, filed Jun. 4, 1993, by Richiuso et al., entitled CASSETTE EJECTING APPARATUS; Ser. No. 205,001 filed on Mar. 1, 1994, by Lawther et al., entitled FILM CARTRIDGE LOADING APPARATUS FOR CAMERA; Ser. No. 204,723 filed on Mar. 1, 1994, by Lawther et al., entitled FILM CARTRIDGE LOADING AND EJECTING APPARATUS FOR CAMERA; Ser. No. 227,170 filed on Apr. 14, 1994, by Lawther et al., entitled CAMERA WITH CARTRIDGE HOLDER MOVABLE BETWEEN OPEN AND CLOSED POSITIONS AND MEANS FOR MOVING A FILM CARTRIDGE AT LEAST PART WAY OUT OF THE CARTRIDGE HOLDER; and Ser. No. 334,503 filed on even date herewith by Fuss et al. and entitled INTERLOCK MECHANISM FOR PREVENTING DEPLOYMENT OF FILM LOADING CHAMBER OF A CAMERA.

FIELD OF THE INVENTION

The present invention relates generally to the field of photography, and more particularly, to an improved film cartridge handling mechanism for effecting end-wise loading of a film cartridge into a deployable film loading chamber of a camera and positioning of the filmstrip with respect to the camera transport path.

BACKGROUND OF THE INVENTION

In conventional cameras, 35 mm film cartridges or cassettes are loaded from the side through a hinged camera back into a loading chamber on one side of the image frame exposure gate, and the filmstrip is either manually or automatically directed through the exposure gate and wound on a take-up reel. After all image frames are exposed, the filmstrip is either automatically rewound by a motorized drive or manually rewound into the cartridge. The cartridge is then typically removed by opening the hinged camera back cover, releasing the drive from the cartridge spool hub and manually withdrawing the cartridge from the loading chamber.

More recently, it has been proposed to load and eject conventional 35 mm cartridges and "thrust" style film cartridges in an end-wise fashion through a sliding or pivoted door in the bottom, top or side of the camera body and to employ motorized filmstrip winding and rewinding apparatus to advance and rewind the filmstrip with respect to the cartridge. Such cameras are disclosed in various configurations, for example, in commonly assigned U.S. Pat. No. 5,049,914 and in U.S. Pat. Nos. 4,363,547, 5,105,211, 5,155,514, 5,159,365 and 5,142,316, and 5,231,438.

In the '914, and '438 patents, and in the above listed patent applications, a camera loading chamber and mechanism is provided for receiving a thrust style, film cartridge which does not have a protruding film leader and has an actuable cartridge door through which the filmstrip is advanced and rewound when the door is opened. Referring now to the drawings and first to FIG. 1, it depicts in perspective view a thrust style film cartridge 10 as shown in the above-referenced '170 application containing a filmstrip wound on and attached at one end to a spool (both obscured within the opaque plastic cartridge shell). The two ends of the spool hub 16 are exposed through light-tight, bearing openings in the first or seated end 12 and the second or free end 11 of the cartridge 10, so that the spool and attached filmstrip may be rotated by rotation of the spool hub 16 upon seating of the cartridge 10 in a camera film loading chamber as described below.

The film cartridge 10 is shaped to form an elongated snout or lip 14 having a filmstrip passage door 18 therein (depicted in a closed position). The door 18 fits in a door opening 24 and is attached to a rotatable door drive hub 26 that extends through openings in the free end 11 and seated end 12. The door 18 and rotatable door drive hub 26 are formed in one piece and comprise a cartridge light lock door (or cartridge door) when fitted into the door opening 24 that replaces the passive, relatively tight, plush lined light lock employed for many years on 35 mm film cartridges. The free end of the filmstrip may be thrust out of the cartridge shell 12 through the door opening 24 by application of counter-clockwise rotary motion to the door drive hub 26 to open the door 18 and by the application of clockwise rotary motion to the spool hub 16 at the seated end 12 to thrust its leading end out past the open door 18.

A retention slot 20 is depicted formed in the inner surface of cartridge snout 14 extending longitudinally between portions 22 and 23 of respective ends of cartridge snout 14 and cartridge shell 12. The retention slot 20 may be employed as a retention slot for cooperation with a spring loaded retention member of the type described in the above referenced '969 patent and '170 application for preventing the cartridge 10 from falling out of or being forcibly ejected completely from the loading chamber 30 when it is deployed in the manner described therein. In particular, the slot 20 may be engaged by a retention member during movement of the film cartridge from the camera loading chamber as proposed in certain of the above-referenced co-pending applications. Various improved apparatus and methods are disclosed therein for receiving and ejecting the cartridge from the loading chamber, wherein the retention slot 20 is engageable by various retention members upon partial insertion into the chamber and remains in engagement upon ejection to prevent the film cartridge from falling out of the loading chamber. The user may typically complete the withdrawal of the cartridge by simply pulling the partially ejected cartridge out, overcoming the retention force.

In certain of the above-listed patents and in all of the above-listed patent applications, the film cartridge loading chamber or holder is either deployable outward from the camera body, as shown for example in the '316, '547 and '211 patents, or is accessible through an end cover as shown in the '438 patent. Latch mechanisms are required for closing the end covers or securing the deployable chamber in the closed position. The '316 patent discloses a typical outward deployable cartridge holder for accepting a film cartridge. In one embodiment, the holder is pivotally supported by a shaft for movement between an outwardly deployed open position in which the holder projects transversely from the camera body and a closed position in which the cartridge holder stands vertically in the camera body. Upon movement into the closed position and with a film cartridge inserted, the upper end of the cartridge is engaged by a lever to hold the cartridge down. The cartridge holder is normally urged towards the open position. A locking lever operates to retain the cartridge holder in the closed position and is coupled with a knob exposed to the exterior of the camera body. A pin extending from the cartridge holder chamber is engaged by the locking lever. The pin is released from the locking lever by manually operating the knob, and the cartridge holder then pivots toward the open position.

In all of the above described mechanisms, the film spool in the film cartridge is engaged at one end by a motorized or manual rewind drive mechanism (for conventional film cartridges) or by a motor driven advance and rewind drive mechanism (for thrust type film cartridges). The other end of the cartridge is typically left free or pressure is applied to the free end (as in the '316 patent described above) and/or laterally to the side of the film cartridge snout or lip by operation of the retention members described above.

The prior art as described above lacks a mechanism for securely engaging and positioning the thrust type film cartridge in a precise alignment with the filmstrip transport path to ensure precise filmstrip advance from the film cartridge door and along the camera film rails in a film plane past the exposure gate. It would be desirable to provide positive engagement and disengagement mechanism operable during closure and opening of the film chamber to effect such alignment employing a minimum number of parts.

SUMMARY OF THE INVENTION

It is therefor a principal object of the present invention to provide a mechanism that positively engages with the film cartridge and the film chamber to align the film cartridge in the film chamber with the camera filmstrip transport path as the deployable film chamber is locked closed.

It is a further object of the present invention to provide a film loading chamber and a loading mechanism for end-wise receiving and positively loading a film cartridge initially inserted manually into the end opening of the film chamber with a combined locating feature for the free end of the film cartridge and latch mechanism for closing the chamber.

In accordance with the invention, an improvement in a camera for receiving a photographic filmstrip cartridge of the type having a filmstrip wound around a filmstrip spool within a film cartridge housing, the cartridge housing having a first end and a second end with end openings through which the spool hub of the filmstrip spool is exposed comprises: a camera body enclosing a camera frame having a film supply cavity and a filmstrip transport path; a film cartridge loading chamber pivotally movable between a deployed position for receiving the film cartridge loaded manually into an end opening thereof and a closed position wherein the film loading chamber is pivoted into the film supply cavity; filmstrip drive means for engaging the filmstrip spool hub when the loading chamber is moved to the closed position and providing a first locating feature; latch means for latching the loading chamber in the closed position upon pivotal movement of the loading chamber into the film supply cavity; and second locating feature coupled with the latch means for engaging the filmstrip spool hub at the cartridge second end at a second locating feature to align the filmstrip along a datum axis in parallel with respect to the film transport path.

Preferably the latch means further comprises: means coupled with the film loading chamber for providing a latch slot; a movable plate attached for movement with respect to the camera frame from an extended position and an engaged position; a latch pin mounted to extend from the movable plate; and means for effecting movement of the movable plate between the extended and engaged positions for engaging the latch pin in the latch slot in the engaged position and for spacing the latch pin out of the latch slot in the extended position.

Moreover, the second locating feature comprises a locator pin mounted to extend from the movable plate in alignment with the first locating feature; and the movement effecting means effects movement of the locator pin into the filmstrip spool hub at the cartridge second end upon movement of the latch pin into the latch slot in the engaged position of the movable plate to align the filmstrip spool along an axis in parallel with respect to the film transport path and effects movement of the locator pin out of the filmstrip spool hub at the cartridge second end upon movement of the latch pin out of the latch slot in the extended position of the movable plate.

The camera preferably is configured to accept a film cartridge of the type having a cartridge door movable on a door hub between an open position for advancing filmstrip onto or from the filmstrip spool and a closed position for enclosing the filmstrip entirely within the cartridge, and the camera further comprises door hub locating feature for engaging the door hub and for aligning the door opening with the filmstrip transport path upon seating the film cartridge in the film cartridge loading chamber and movement into the closed position.

Advantageously, the present invention provides for a side pivoting deployable film loading chamber for accepting a film cartridge that allows the film cartridge to be positively seated and accurately aligned in reference to a datum axis as the film loading chamber is latched closed. Advantageously, in use of the invention with a thrust style film cartridge, the seating of the cartridge in the film loading chamber aligns the film cartridge door with the camera filmstrip transport path. Upon movement of the film loading chamber to the latched or closed position, the film door is opened and the film cartridge spool is engaged with a filmstrip advance motor drive mechanism to advance the aligned filmstrip into the filmstrip transport path.

Other objects, advantages and features of the present invention will become apparent from the following specification when taken in conjunction with the accompanying drawings in which like elements are commonly enumerated and in which:

BRIEF DESCRIPTION OF THE DRAWINGS

FIG. 3 is an exploded perspective view of the components of the film loading apparatus of FIG. 2;

DETAILED DESCRIPTION OF THE PREFERRED EMBODIMENT

Figure 1:
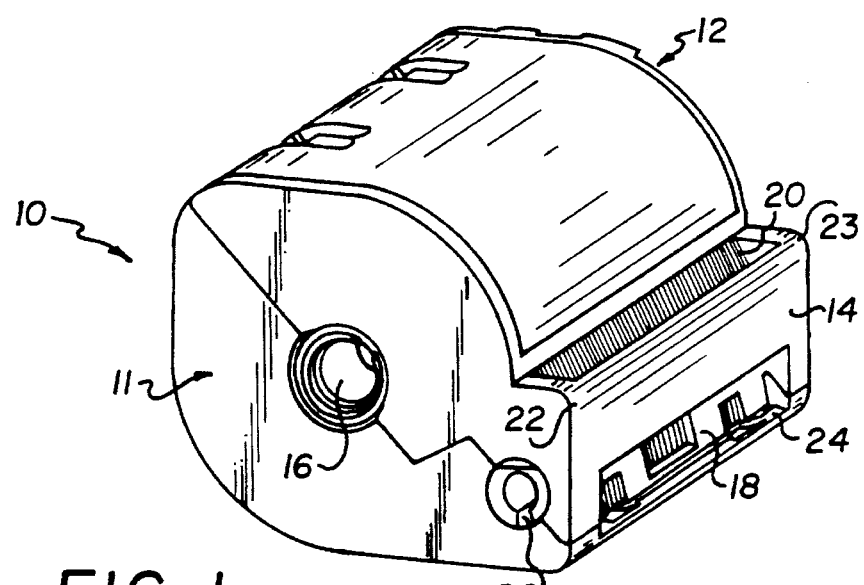
FIG. 1 is a perspective view of a thrust type film cartridge usable in the film loading apparatus of the present invention.

The invention is disclosed as being embodied preferably in a still-picture camera employing a thrust type film cartridge of the type shown in FIG. 1. The specific camera in which the present invention may be incorporated may take any of the forms known in the art having a film loading chamber on one end of the camera body and a take-up chamber for the filmstrip on the other end of the camera body and an image frame exposure gate between the two ends. A battery powered, reversible motor drive is provided to engage the spool of the film cartridge after it is loaded to advance the leading end of the filmstrip from the film cartridge through the exposure gate and into the takeup chamber. During the taking of photographs, the filmstrip is advanced by rotation of a takeup spool an image frame at a time. The film cartridge spool is rotated in the reverse direction to rewind the filmstrip from the takeup chamber back into the film cartridge after all image frames are exposed. In that process, the filmstrip is guided along its edges between spaced rails and a backing plate to be aligned as nearly as possible with an image focus plane in the exposure gate. Photographic exposures are made in the image frames in the exposure gate through operation of the aperture setting and shutter release mechanisms of the camera in a manner well known in the art. Because the features of this type of camera are generally well known, the description which follows is directed in particular to camera elements forming part of or cooperating directly with the preferred embodiments of the film loading chamber apparatus. It is to be understood, however, that other elements not shown or described may take various forms known to one of ordinary skill in the art.

In accordance with a first aspect of the invention, it is necessary to securely and accurately position the film cartridge so that the filmstrip is aligned to the image focus plane of the camera despite position variances that arise due to dimensional tolerances between the outer dimensions of the filmstrip cartridge 10 and the inner dimensions of the magazine of the loading chamber and the reduced size of the film cartridge. In accordance with a principal aspect of the present invention, the spool hub 16 of the film cartridge 10 is also engaged at the film cartridge seated end 12 by a drive spindle at a first locator point "A" and at the free end 11 at a second locator point "B" by a locator feature pin as the loading chamber is latched in the loaded or closed position, so that the axis of rotation of the filmstrip spool is fixed. Similarly, the door drive hub 26 is engaged at the seated end of the cartridge 10 by a cartridge door driver carried by the film loading chamber to define a third locator point "C" for the cartridge lip 14. A fourth locator point "D" may be provided optionally to fit within the other end of the single piece door drive hub 26 exposed through an opening of the free end of the film cartridge end. The locator points "A" and "B" are aligned to define a first locating axis referenced orthogonally to the hinge axis of the deployable film chamber and in parallel with the filmstrip transport path of the camera. The locator point "B" is referenced to a latch pin for engaging and latching the film loading chamber in the loaded position. The locator point "C", and optional locator point "D", are referenced to the hinge mechanism to align the cartridge end 14 with the filmstrip transport path.

FIGS. 2–14 depict a preferred embodiment of a film loading mechanism for a side deployable film loading chamber that provides the accurate and precise positioning of the film cartridge and the filmstrip contained therein with respect to the film transport path of the camera employing these locator points, in which the present invention is preferably implemented. FIGS. 5 and 6 specifically depict an interlock lever mechanism for detecting filmstrip presence in the film transport path and for inhibiting deployment of the film loading chamber in conjunction with the present invention. The following describes the invention in the context of a preferred embodiment in which it is implemented.

Figure 2:
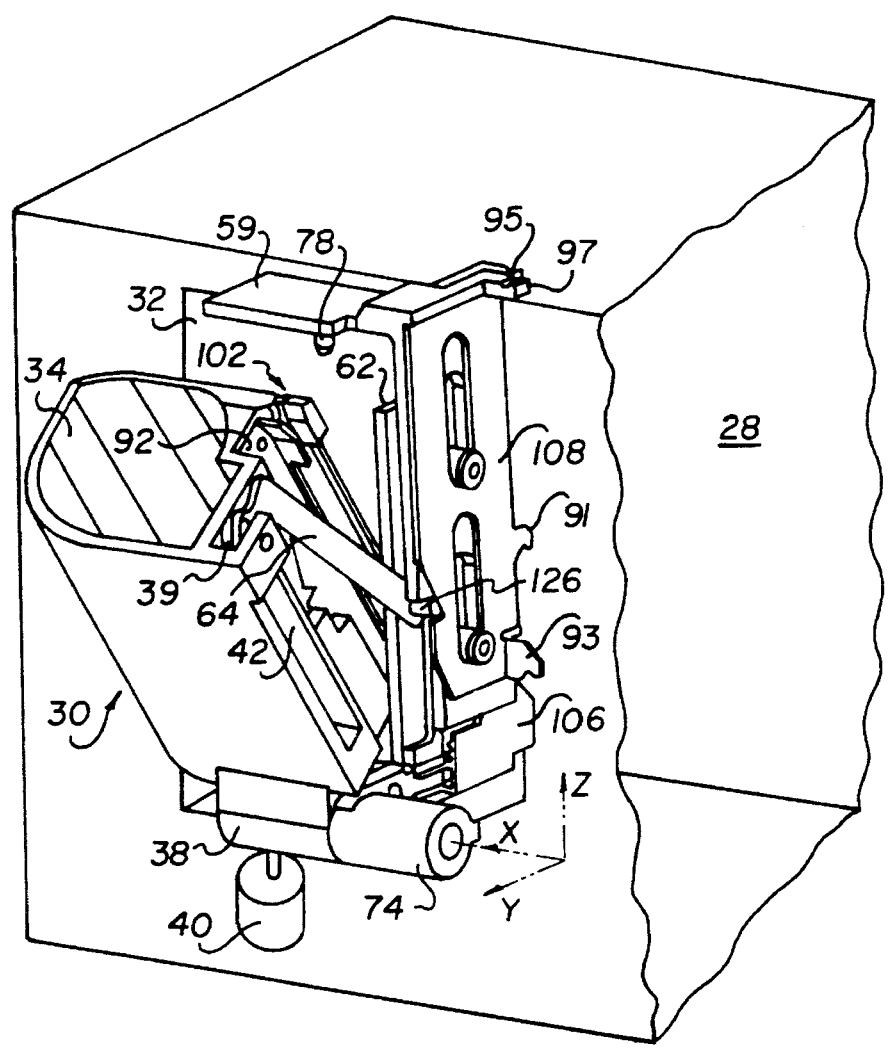
FIG. 2 is a perspective, partial view of the components of the positive film cartridge loading and ejecting apparatus of the invention in the deployed position for receiving a film cartridge in relation to a camera body.

Turning to FIG. 2, the film cartridge 10 is intended to be inserted end-wise into the magazine 34 of a deployed film loading chamber 30 that is pivotable at one hinged end 38 thereof out of a film supply cavity 32 in the side of a camera body 28 of the type described above. The elongated magazine 34 is shaped to fit the outer shape of the cartridge housing 12 and to receive the full length of the cartridge 10 within it, with the seated end 12 of the film cartridge 10 inserted downward into the magazine 34. When the film cartridge is received, the door drive hub 26 of the film cartridge 10 is engaged and centered by a cartridge door driver (not shown) as the C-point locator, which is then ready to open the door 18. Similarly, the end of the spool hub 16 accessible from the seated end 12 is seated and centered onto the drive spindle 45, FIG. 10, providing the A-point locator. The optional D-point locator pin 78 in alignment with the cartridge door driver is also depicted in FIG. 2.

As the film loading chamber 30 is pivoted into the film supply cavity 32, the loading chamber 30 is latched closed in a manner described below. Full closure and latching of the film loading chamber 30 into film supply cavity 32 also effects the centering of the spool hub 16 which is accessible from the free end 11 onto a B-point locator pin (described below). The cartridge door driver is simultaneously rotated to open the door 18. The drive spindle 45 (shown in FIG. 10) is connected through a gear drive train (not shown) to a schematically illustrated filmstrip advance and rewind drive mechanism 40. The drive mechanism 40 may be then operated to advance the filmstrip out through the door opening 24 past the open door 18. The drive mechanism 40 is shown schematically, and it will be understood that, in practice, a drive motor is mounted in the camera body and a reduction gear drive assembly is provided between the drive motor and a drive spindle 45 (shown in FIG. 10) that engages the spool hub 16 when the film cartridge 10 is loaded into the magazine 34 of the film loading chamber 30. Such a motor and gear drive assembly is shown, for example, in U.S. Pat. No. 2,548,549, incorporated by reference herein.

In this closed position, the cartridge door 18 is aligned parallel to the axis of the A-point locator and the B-point locator pin and stabilized from rotation about the axis by the engagement of the cartridge door driver with the door opening hub 26 providing the C-point locator. The filmstrip is aligned with a filmstrip passage 42 in the loading chamber 30 through which the filmstrip leading end may be advanced toward the camera exposure gate and take-up chamber (not shown). The filmstrip passage 42 is aligned precisely to film guiding rails (shown in FIGS. 5 and 6) of the camera body 28 so that the filmstrip leading end is thrust out of the filmstrip cartridge 10 in alignment therewith and does not twist or stub as it is advanced. After the filmstrip leading end is advanced a certain distance, it enters the takeup chamber and is wound about a takeup hub which is rotated during subsequent image frame advancement as described above.

To summarize the operation of the preferred embodiment, the latching of the film loading chamber 30 when it is manually pushed into the film supply cavity 32 is effected by the downward movement of a laterally extending latch pin from a B-plate 50 (obscured in this view), which is affixed for relative downward movement with respect to the camera body 28, into engagement with the latch slot 102 of a mounting plate 92 in a manner described more fully below. At the same time, a downwardly projecting B-point locator pin 48 extending from the horizontal extension 59 of the B-plate 50 engages and centers the spool hub 16 accessible from the free end 11 of the cartridge while the other end of the spool hub 16 is seated on the spindle 45 of the film drive mechanism 40. As downward movement of the B-plate is completed, the cartridge door driver 44 seated in the rotatable door hub 26 rotates to open the door 18. In this manner, the film cartridge 10 is fixedly centered in the magazine 34 by positive seating of its spool end hub 16 axially between the drive spindle 45 A-point locating feature and the B-point locator pin 48, and the loading chamber 30 is also latched to the B-plate 50. Since the B-plate 50 and the lower hinged end 38 are secured to the camera body 28, the film cartridge snout 14 and door 18 are precisely aligned and stably retained in relation to the filmstrip transport path of the camera body 28.

Figure 4:
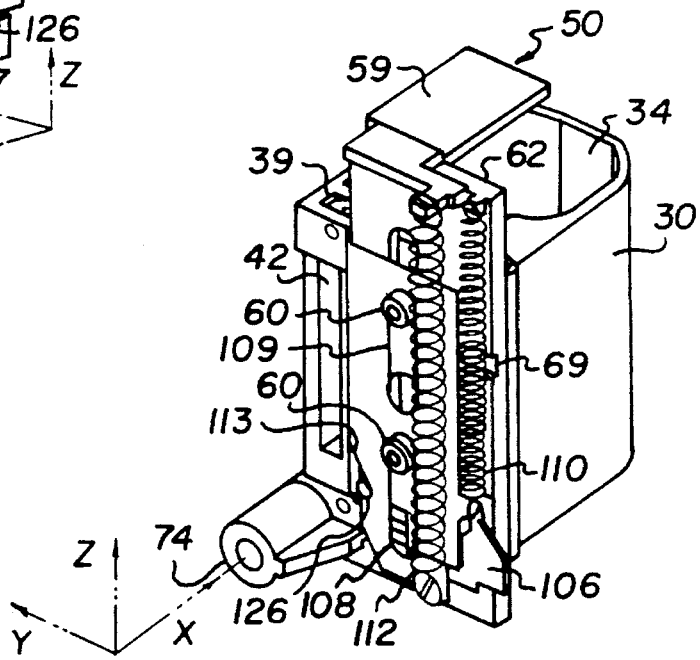
FIG. 4 is a perspective assembly view of certain of the components of FIG. 3.
Figure 5:
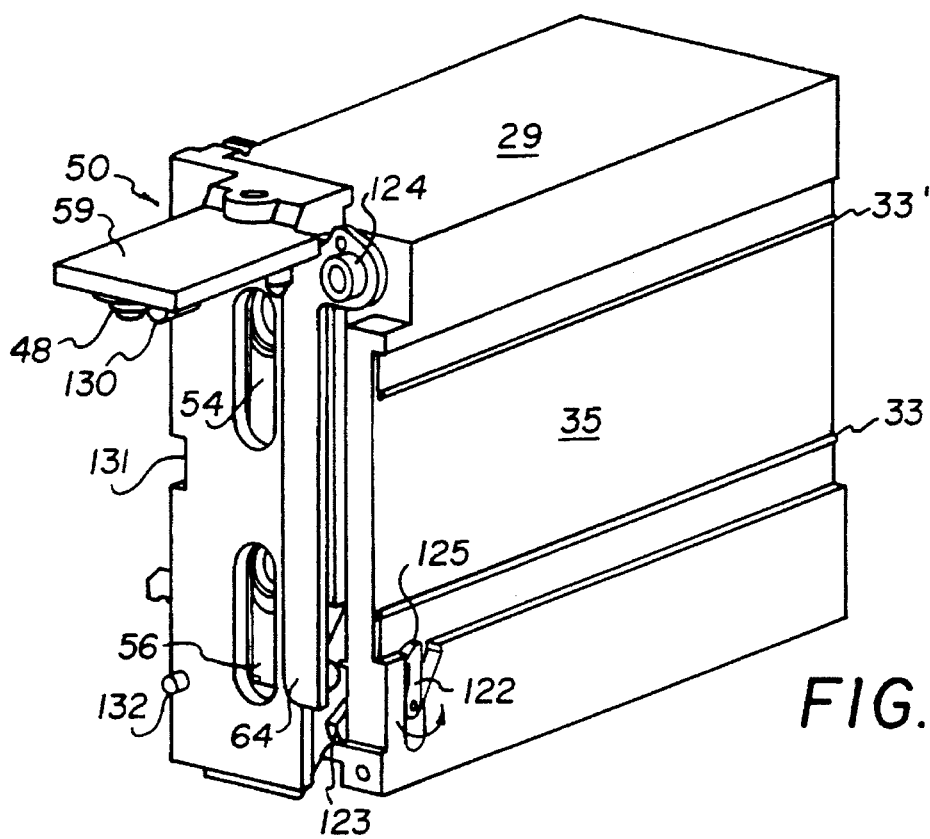
FIGS. 5 and 6 are perspective views of certain of the components of FIG. 3 assembled to a camera frame providing a film transport path.
Figure 6:
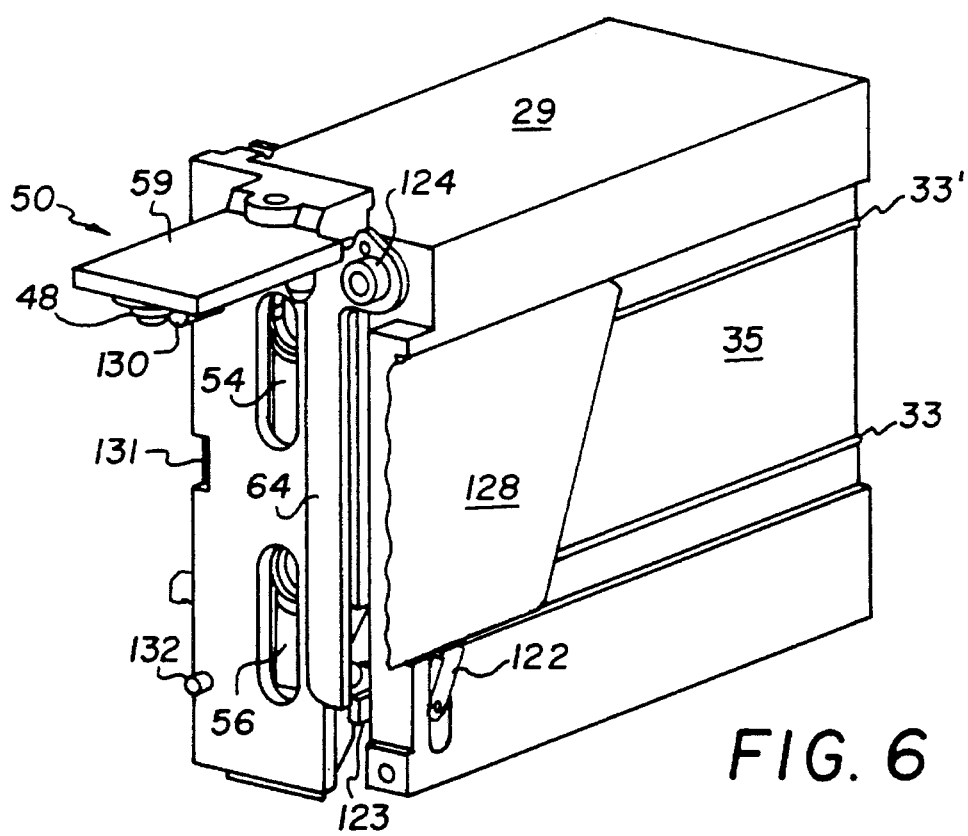
Figure 7:
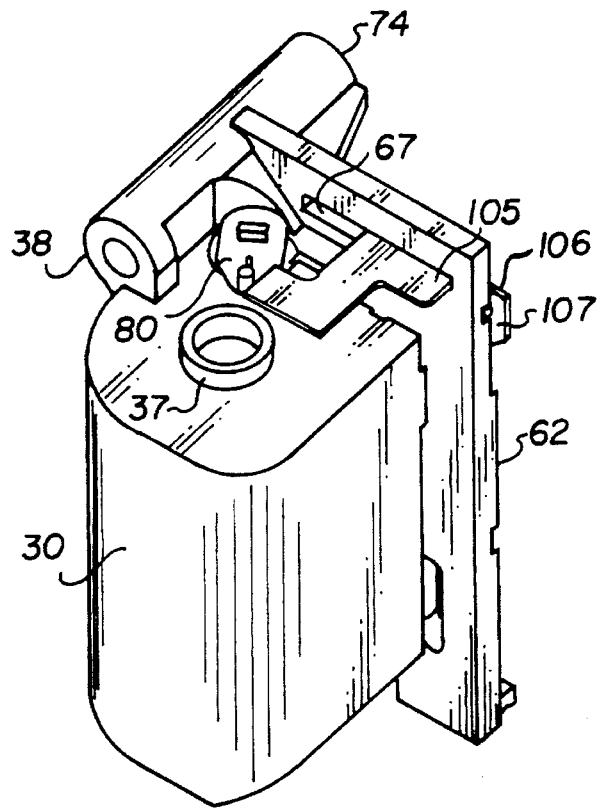
FIG. 7 is a bottom perspective view of the assembly of FIG. 3 depicting the mechanism for opening and closing the film cartridge door.

The components of the preferred embodiment are depicted in greater detail in the exploded view of FIG. 3, the assembly view of FIG. 4 and the partial perspective views of FIGS. 5, 6 and 7. The film loading chamber 30 is constructed of a single piece of molded plastic or the like having the magazine 34 and filmstrip passage 42 formed therein and a hinge pin receptacle 46 at the hinged end 38 thereof. The film loading chamber 30 is also formed to have attachment points and recesses to accommodate certain of the component group 60 for seating and partially ejecting the film cartridge 10 depicted in FIG. 3, described below. A mounting plate 62 is attached to the camera body 28 (FIG. 2), and the B-plate 50 and associated components are mounted to the mounting plate 62 for relative movement with respect to it and the components attached to the film loading chamber 30. The interconnection between the film loading chamber 30, including the component group 60, is made through the cocking lever 64 and the lower hinge formed by the hinge pin 70 fitting within the hinge pin receptacle 72 in the hinged end 38 of the film loading chamber 30 and the hinge pin receptacle 74 attached to the mounting plate 62, respectively. The cartridge door driver assembly including the driver 44 attached to cartridge door driver lever 80 and spring 84 is positioned on the base of the film loading chamber 30 for insertion into the door hub 26 and rotation on upward and downward movement of the B-plate 50 in a manner described below. The drive spindle 45 providing the A-point locator that makes engagement with the spool hub 16 when the film cartridge 10 is loaded into the magazine 34 is obscured from view in FIG. 3 but shown in FIG. 10.

The component group 60 includes a detent spring 86, ejector latch stud 88, ejector latch 90, mounting plate 92, slide ejector 94, retaining plate 96, slide ejector stud 98, and slide ejector spring 100. The component group 60 is mounted against the vertical side wall 31 of the film loading chamber 30 in the sequence depicted in FIG. 3 to form the assembly depicted in FIG. 2. The component group 60, although changed in certain details, operates in cooperation with wipe-by cam screw 114, wipe-by cam spring 116, wipe-by cam 118 in a manner described in the above-referenced '170 application, and not specifically illustrated in this application.

In general, the wipe-by cam 118 and spring 116 are mounted to the camera frame 29 (shown in FIG. 5). The ejector latch 90 is attached to the mounting plate 92 for pivotal movement by the ejector latch stud 88 so that the pin 71 bears against the wipe-by cam 118. Slide ejector 94 is attached between retaining plate 96 by slide ejector stud 98 extending through the elongated slot of the slide ejector 94 and attached to the mounting plate 92. Slide ejector spring 100 is attached between pin 75 and tab 73. Tab 76 extends against the seated end of cartridge 10. When a cartridge 10 is inserted into the magazine 34 of the loading chamber 30 in its deployed position and manually pressed to the fully seated position, the tab 76 is pressed downward and slide ejector spring 100 is tensioned. Detent spring 86 is attached to a pin (obscured) between plate 92 and surface 31 and is biased to extend into the slot 20 of cartridge 10, when it is seated within the magazine 34. The free end 78 of ejector latch 90 engages the cartridge retention slot 20, holding the cartridge in its seated position, resisting the bias force of slide ejector spring 100.

As the film loading chamber 30 deploys into the open position, the pin 71 on the slide ejector latch 90 strikes the underside of the wipe-by cam 118 which does not rotate when struck from this direction. The pin 71 is therefore forced to slide over the cam surface of wipe-by cam 118, causing the free end 78 of ejector latch 90 to withdraw from retention slot 20. The withdrawal of the free end 78 allows the slide ejector 94 to rise in response to the biasing force of the slide ejector spring 100. The cartridge 10 is lifted by the tab 76 into an ejected (unseated) position for manual withdrawal by the user.

When the components of group 60 are assembled to one another and the film loading chamber 30, the latch slot 102 of mounting plate 92 is positioned to receive a latch pin (obscured from view) extending horizontally from the vertical plate extension 55 of B-plate 50. At the same time, the B-point locator pin 48 makes engagement with the spool hub 16 to securely align the film cartridge 10 and the film loading chamber 30 in the manner described above.

Turning to the mounting plate components depicted in FIG. 3, they include the mounting plate 62, B-plate 50, cartridge door driver lever actuator 106, spring plate 108, spring plate spring 110, B-plate spring 112, and B-plate trigger 120. These components are assembled as shown in the assembly view of FIG. 2, except that the springs 110 and 112 have been removed in that view to clarify the illustration. FIG. 4 presents a further perspective view taken at a different angle with the springs 110 and 112 attached at one end to separate tabs 91 and 93, respectively, on the spring plate 108 and at the other end to tab 95 on the mounting plate 62 and to tab 97 on the B-plate 50, respectively, (shown in FIG. 3). As shown in FIG. 4, the springs 110 and 112 are extended, since the B-plate 50 is extended above the loading chamber 30 into its extended position. The B-plate spring 112 tends to pull the B-plate 50 and the spring plate 108 together. The spring plate spring 110 tends to pull the spring plate 108 upward with respect to the mounting plate 62 in the pre-latch position. As shown, the B-plate 50 is poised to move downward to make the engagement with the cartridge spool hub and latch slot in this position.

The B-plate spring 112 is stronger than the spring plate spring 110 because the force of the B-plate spring 112 is required to seat the film cartridge 10. The force of the spring plate spring 110 lifts the B-plate and the spring plate 108 away from the free end of the cartridge 30 during deployment of the film loading chamber 30.

The mechanical attachment plate 62 is physically attached to the camera body 28 capturing the cartridge door driver lever actuator 106, the B-plate 50, the spring plate 108, the B-plate trigger 120, and the springs 110 and 112 therebetween. The B-plate trigger 120 is captured in a slot in the mechanical attachment plate 62. These components are viewed from the camera body side in FIGS. 2 and 4 and are further viewed from inside the film supply cavity 32 assembled to the camera frame 29 in FIGS. 5 and 6. The vertical plate section 55 of the B-plate 50 nests between the vertical mechanical plate 62 and the vertically disposed spring plate 108 as described above, and the horizontal plate extension 59 extends over the open end of the magazine 34. When so assembled, the B-plate 50 and the spring plate 108 are slidable vertically up and down between the extended and engaged positions with respect to the mechanical attachment plate 62 and the cartridge door driver lever 106. The range of movement is provided by the elongated slots 54 and 56 in the vertical plate extension 55 which nests into the studs 66 and 68. The studs 66 and 68 extend through the elongated openings 109 and 111 in the spring plate 108 and are attached to the camera frame 29 by attachment screws (not shown) that are screwed in through the film supply cavity 32 with the film loading chamber 30 tilted outward. A further point of attachment with camera frame 29 may also be provided adjacent to the hinge receptacle 74 in the mechanical plate 62. The manner in which the B-plate 50 and the spring plate 108 are moved longitudinally in the vertical or Z-direction with respect to the studs 66 and 68 and mounting plate 62 will be described in detail below.

As shown in FIGS. 1–3, the cocking lever 64 and a cocking lever spring 63 are pivotally mounted at axle end 124 on an axle pin (not shown) within the recess 39 of the loading chamber 30, so that the spring 63 biases the cocking lever to rotate rearward in film supply cavity 32. A pin 126 at the other end of the cocking lever 64 engages a shoulder 57 in vertical plate extension 55 and also bears against the sloped notch 113 of spring plate 108.

Referring now to FIGS. 5 and 6, the assembly described is oriented against the end of the interior camera frame 29 (with the hinge member 74 removed from the mechanical plate 62 for clarity of view). The camera frame 29 is depicted schematically as providing first and second film guide rails 33, 33' of a film transport path 35 which is aligned with the elongated window opening 42 of the film loading chamber 30. It will be understood that the backing plate of the camera body that defines the other side wall of the film transport path 35 is also not shown in FIGS. 5 and 6.

FIGS. 5 and 6 show other features, including the location of the cocking lever 64 with respect to the B-plate 50 and the spring plate 108 and, particularly, a locking mechanism for preventing deployment of the loading chamber 30 when a filmstrip is in the film transport path 35. In this regard, when a filmstrip is not present in the film transport path 35, the interlock lever 122 pivots counter-clockwise under the force of an internal torsion spring wound about an axle pin of interlock lever 122, so that the interlock lever end or arm 123 is biased to extend below the free end of the cocking lever 64. In this position shown in FIG. 5, the interlock lever arm 123 does not inhibit the pivotal movement of cocking lever 64 about its pivot end 124 mounted to the film loading chamber 30 in the manner depicted in FIG. 2.

Referring to FIG. 6, when a filmstrip 128 is present in the film transport path 35, the interlock lever 122 is pivoted clockwise by the filmstrip 128 edge contacting the film transport path lever end or arm 125. The filmstrip 128 is restrained to be relatively flat in the transport path 35 by the pressure of the rails 33, 33' against a backing plate (not shown) and consequently is fairly rigid in the cross-film direction. In order for the camera user to deploy the loading chamber 30, it is necessary to move the free end of the cocking lever 64 outward to release pin 126 from the shoulder 57 of vertical extension plate 55 and notch 113 of the spring plate 108 in a manner described below. When the filmstrip 128 is in the film transport path 35 as shown in FIG. 6, the filmstrip edge contact overcomes the spring bias to rotate the interlock lever arm 123 into an interference position blocking outward movement of the free end of the cocking lever 64. Thus, as long as the filmstrip 128 is in the filmstrip transport path 35, the user cannot move the free end of the cocking lever to deploy the film loading chamber.

The vertical plate extension 55 also includes a further horizontally extending drive pin 132 shown in FIGS. 5 and 6 that engages the angled edge of the vertically extending plate 107 of the cartridge door driver lever actuator 106. The cartridge door driver lever actuator 106 is also depicted in FIGS. 3 and 4 as having the horizontal or X-direction extending lever arm 105 and the vertical or Z-direction extending arm 107. The horizontal extending lever arm 105 extends through the elongated slot 67 in the mechanical mounting plate 62 and interacts with the cartridge door driver lever 80 to control the rotary motion of the cartridge door driver 44, as the film loading chamber 30 is pivoted into the closed position in a manner to be described hereafter.

Turning now to FIG. 7, it depicts a perspective view of the underside of the film loading chamber 30 in relation to the mechanical mounting plate 62 in order to show the interaction of the horizontal lever arm 105 of the cartridge door driver lever actuator 106 with respect to the cartridge door driver lever 80. In FIG. 7, it may be observed that the horizontal plate extension 105 extends through the elongated opening 67 to contact the cartridge door driver lever 80. A bushing surrounding an opening 37 in the film loading chamber 30 is also provided to receive and retain the drive spindle 45 and attached gear (not shown) of the drive mechanism 40 (FIG. 2) for rotation in the opening 37.

Figure 10:
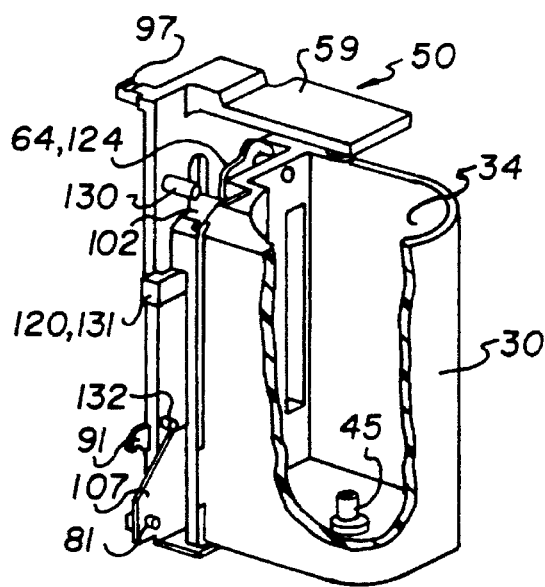

Referring to FIG. 10, the drive spindle 45 extending into the magazine 34 engages the spool hub 16 of the seated end 12 of the filmstrip cartridge 10 when it is manually inserted and seated in the magazine 34. The drive gear and spindle 45 are therefore movable with the film loading chamber 30 between the deployed and closed positions in a manner shown, for example, in the above-referenced '547 patent.

The cartridge door driver lever actuator 106 is depicted in the position which keeps the film cartridge door 18 closed. The film chamber door 18 is opened upon complete pivoting movement of the film loading chamber 30 back into the film supply cavity 32 after a film cartridge 10 is loaded into the magazine 34 and downward movement of the B-plate 50 and drive pin 132 against the sloped edge of the vertical plate extension 107. When that occurs, the horizontal plate extension 105 moves horizontally in the Y-direction (FIG. 2), that is, along the slot 67 from the position depicted in FIG. 7. When that movement occurs, the cartridge door driver lever 80 is rotated and in turn rotates the cartridge door driver 44 in the clockwise direction (from the point of view of FIG. 7) against the force of the cartridge door spring 84 (FIG. 3). The cartridge door driver 44 is engaged with the door opening hub 26 (FIG. 1) and causes the door 18 to be opened to allow the film strip within the film cartridge 10 to be advance by operation of the film drive mechanism 40.

Figure 8:
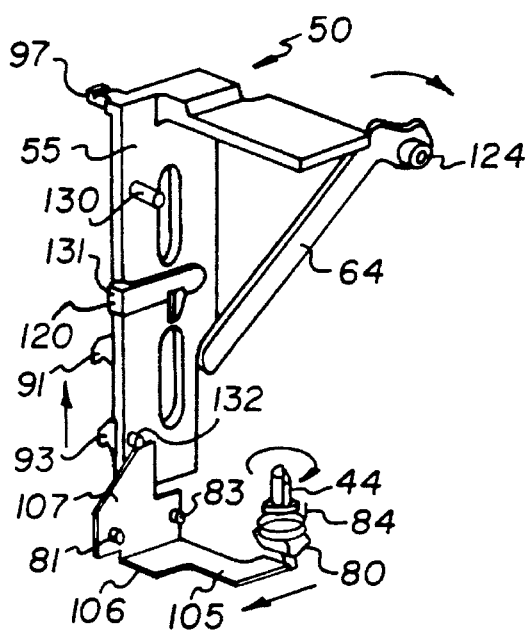
FIGS. 8–11 are further perspective views of the operation of the film loading apparatus during the steps of latching the loading chamber into the closed position with certain components of the assembly removed for ease of illustration.
Figure 9:
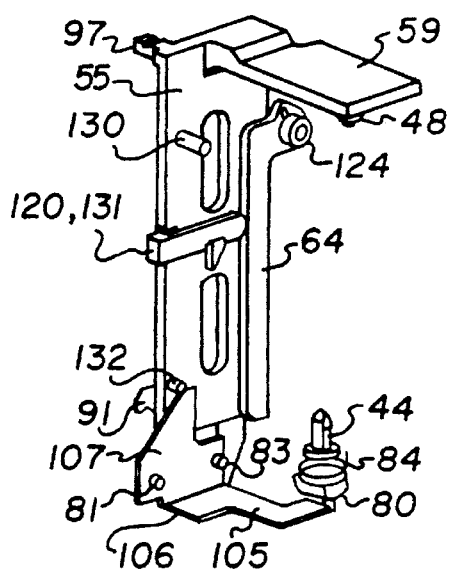
Figure 11:
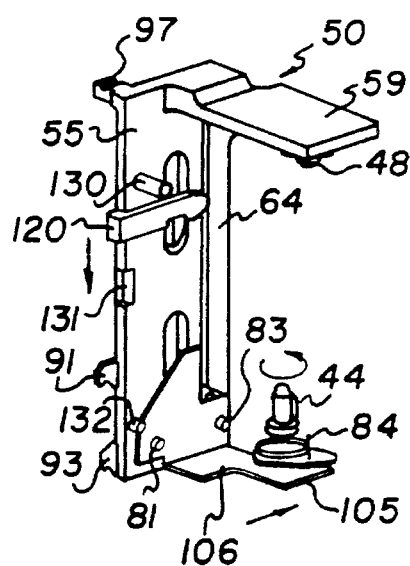

FIGS. 8–11 are further illustrations of the interaction between the movement of the B-plate 50 and the cartridge door driver lever 106 during the steps of latching the loading chamber 30 into the closed position with certain components of the assembly removed for ease of illustration. For example, the mechanical plate 62 is removed, so that the relation of the drive pin 132 with respect to the vertically extending plate 107 of the cartridge door driver lever actuator 106 may be observed as the B-plate 50 moves upward upon opening of the film loading chamber 30 in FIG. 8 and downward on closing and latching as shown in FIGS. 9–11. A pair of guide pins 81, 83 are also shown that fit within a groove in the mechanical plate 62 just above and parallel with the elongated slot 67 to guide the horizontal movement of the cartridge door driver lever actuator 106.

FIGS. 8–11 also show the interaction between the B-plate trigger 120 and the B-plate 50 when the cocking lever 64 is in the deployed position of FIG. 8 and the closed position of FIGS. 9–11. The B-plate trigger 120 is fitted within an elongated retention slot 69 (shown in FIG. 3) of the mounting plate 62 and retained there between the mounting plate 62 and the vertical extension plate 55 when the plates are assembled to the camera frame 29 as described above. The B-plate trigger 120 can slide back and forth in the retention slot 69 in the Y-direction without coming out because of its shape with respect to the retention slot 69. A cam end 121 is formed at one end that fits into the rear cut-out 131 of the vertical extension plate 55 to limit upward travel and lock it in the up and open position of FIGS. 2 and 8. The B-plate trigger 120 is biased outward in the Y-direction by a compression spring (not shown) acting on a downwardly extending tab of the B-plate trigger 120. Therefore, when the loading chamber is closed, the B-plate trigger 120 is pushed rearward by the cocking lever 64 in the closed position and is allowed to move forward when the cocking lever 64 is deployed into the open position of FIG. 2. When the B-plate trigger 120 is pushed rearward by the cocking lever 64 and the cam end 121 is pushed out of the rear cut-out 131, the vertical extension plate 55 is released to move to the engaged position as shown in FIGS. 9–11 under spring tension provided by the B-plate spring 112 and the spring plate spring 110.

FIG. 8 depicts the assembly with the film loading chamber (not shown) and the cocking lever 64 moving outward into the deployed position and the B-trigger 120 latched into cut-out 131 of the upwardly moving B-plate 50 at the final point of upward movement. Upward movement is caused by the spring tension of the spring plate spring 110 which is attached to the mounting plate 62. During the upward movement of the drive pin 132, the cartridge door driver lever actuator 106 is moved rearward in the Y-direction under the influence of the cartridge door spring 84. The release of spring tension rotates the cartridge door lever driver 80 and attached cartridge door driver 44 in the counter-clockwise direction (from this point of view) to close the door 18 of the film cartridge.

FIG. 9 shows the B-plate 50 in the full up position just as the loading chamber (not shown) is pushed into the camera cavity. At that point, the side of the cocking lever 64 bears against the end of the B-plate trigger 120, which is about to fully move out of the cut-out 131. FIG. 10 shows the same position with the loading chamber 30 partially depicted in order to show the latch pin 130 poised above the latch slot 102. Referring back to FIG. 3, the latch pin 130 extends through the elongated opening 61 in the mechanical mounting plate 62 to make engagement in the latch slot 102 of the mounting plate 92 which is mounted to the side 31 of the film loading chamber 30.

The latch pin 130 extends horizontally out from the vertical plate extension 55 just below the horizontal plate extension 59 of B-plate 50, and the B-point locator pin 48 is shown extending downwardly from the horizontal plate extension 59. The line between the B-point locator pin 48 and the drive spindle 45 extending upwardly through the seated end opening 37 defines the A—B axis of alignment of the filmstrip 10 in parallel with the plane of the filmstrip transport path.

When the cocking lever 68 is fully in the closed position, it moves the B-plate trigger 120 and releases cam end 121 from the cut-out 131. The spring tension of the B-plate spring 112 pulls the B-plate 50 downward as shown in FIG. 11 and latches the latch pin 130 firmly into the latch slot 102. The B-point locating feature pin 48 engages and centers the spool hub 16 of the film cartridge (not shown).

At the same time, the drive pin 132 rides down the slanted edge of the vertical extension plate 107 of the cartridge door driver actuator 106 to move it outward in the horizontal Y-direction. During that movement, the cartridge door driver lever 80 is rotated counter clockwise in this view (and clockwise as shown in FIG. 7) to effect the opening of the cartridge door 18.

Figure 12:
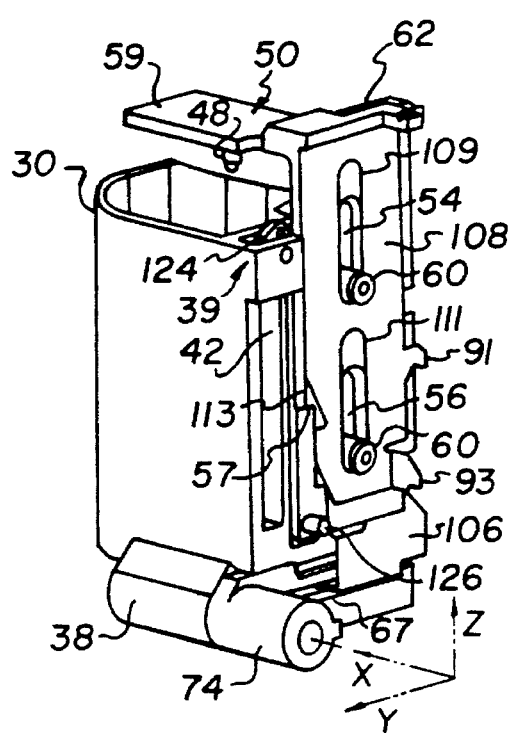
FIGS. 12–14 are further perspective views of the operation of the film loading apparatus depicting the manner in which the loading chamber is deployed from the closed position of FIG. 11 to the open position of FIG. 2.
Figure 13:
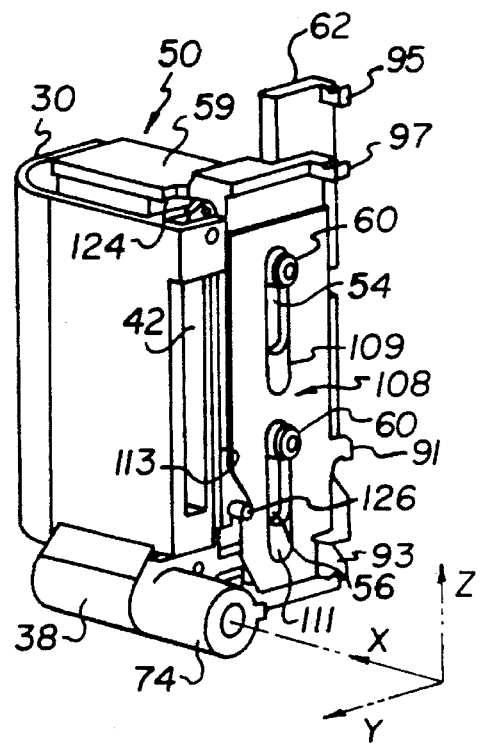
Figure 14:
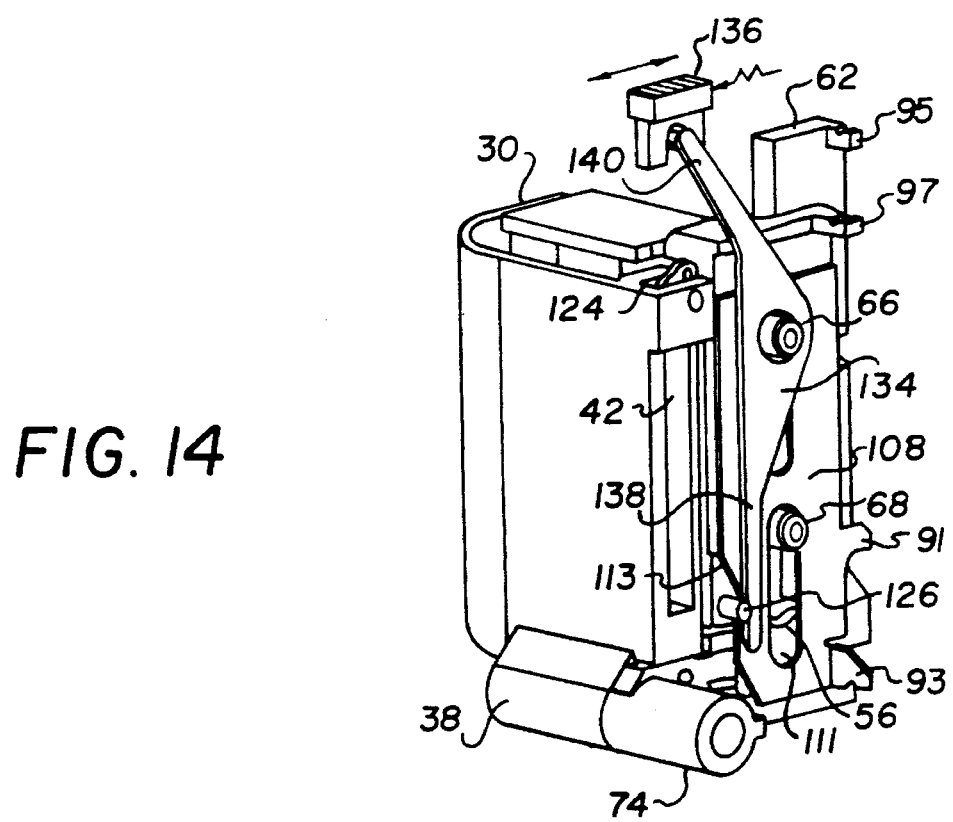

Turning now to FIGS. 12–14 in conjunction with FIG. 2, they depict the manner in which the loading chamber is deployed from the closed position of FIG. 11 to the open position of FIG. 8. In FIG. 12, the free end pin 126 of the cocking lever is shown in the notch 113 of the spring plate 108 and against the shoulder 57 of the vertical plate extension 55.

In FIG. 13, the cocking lever 64 is pushed out of the notch 113 allowing the spring plate 108 and to B-plate 50 to rise upward by the tension of the spring plate spring 110, FIG. 4. As described above, the cartridge door driver 44 rotates the cartridge door 18 closed. Latch pin 130 is withdrawn from latch slot 102, and B-point locator pin 48 is retracted from the spool hub 16. The B-plate 50 is latched up by the B-plate trigger 120 as shown in and described with reference to FIG. 9 to halt upward movement.

The cocking lever spring 63 then pivots the cocking lever 64 downward and outward from the position of FIG. 13, and the loading chamber 30 is deployed to the open position of FIG. 2. As described above with respect to FIG. 6, if the filmstrip is not fully retracted into the film cartridge 10 and contacts the interlock lever 122, the cocking lever 64 cannot pivot forward, and the loading chamber 30 remains in the position of FIG. 13.

FIG. 14 depicts one manner in which a release lever 134 and a manual slidable latch 136 may be combined into the fixed component group between the spring plate 108 and the camera frame 29 to apply the outward opening force to pin 126. The release lever 134 is pivotally mounted to the stud 66, and a first end 138 may be pivoted outward against the pin 126 as the second end 140 is moved rearward by manipulation of the slidable latch 136 against a spring bias force in a manner well known in the art.

The invention may be modified to operate with any particular cartridge configuration or design that may be developed. The component group 60 and wipe-by components 114–118 are illustrated as only one way of seating and ejecting filmstrip cartridge 10 and may be modified to operate with other film cartridge configurations that substitute other mechanisms for the elongated retention slot 20 without affecting the present invention.

It will also be understood that the filmstrip drive mechanism may be supported above the plate extension 59 with the drive spindle 45 extending through it in substitution for the B-point locator pin 49, and an A-point locator pin may be located in the seat end of the magazine 34 in substitution for the drive opening 37 shown in FIG. 4. The drive spindle and an attached drive gear may be mounted to the upper surface of plate extension 59, and the drive gear mechanism may be engaged and disengaged by a filmstrip advance/rewind drive motor gear mechanism fixed to frame 29 by movement of B-plate 50 between the engaged and extended positions thereof, respectively, as described above.

While there has been shown what are considered to be the preferred embodiments of the invention, it will be manifest that many changes and modifications and substitutions of technically equivalent structure may be made therein without departing from the essential spirit of the invention. It is intended, therefore, in the following claims to cover all such changes and modifications as may fall within the true scope of the invention.

PARTS LIST FOR FIGS. 1–14 film cartridge 10
cartridge free end 11
cartridge seated end 12
cartridge snout 14
cartridge spool hub 16
film door 18
retention slot 20
door opening 24
rotatable door hub 26
camera body 28
camera frame 29
film loading chamber 30
vertical side wall 31
film supply cavity 32
guide rails 33, 33'
magazine 34
film transport path 35
door opening driver 36
drive shaft opening 37
hinged end 38
recess 39
filmstrip drive mechanism 40
filmstrip passage 42
cartridge door driver 44
drive spindle 45
hinge pin receptacle 46
B-point locator pin 48
B-plate 50
elongated slots 54, 56
vertical plate extension 55
shoulder 57
horizontal plate extension 59
component group 60
mounting plate 62
bias spring 63
cocking lever 64
mounting studs 66, 68
elongated slot 67
retention slot 69
hinge pin 70
pin 71
hinge pin receptacle 72
tab 73
hinge pin receptacle 74
pin 75
tab 76
D-point locator pin 78
cartridge door driver lever 80
guide pins 81, 83
spring 84
detent spring 86
ejector latch stud 88
ejector latch 90
tabs 91, 93, 95, 97
mounting plate 92
slide ejector 94
retaining plate 96
slide ejector stud 98
slide ejector spring 100
latch slot 102
horizontally extending lever arm 105
cartridge door driver lever actuator 106
vertical plate extension 107
spring plate 108
elongated openings 109, 111
spring plate spring 110
B-plate spring 112
sloped spring plate notch 113
wipe-by cam screw 114
wipe-by cam spring 116
wipe-by cam 118
B-plate trigger 120
cam end 121
film present interlock lever 122
interlock lever arm 123
axle end 124
film transport path lever arm 125
cocking lever pin 126
filmstrip 128
latch pin 130
rear cut-out 131
horizontally extending drive pin 132
release lever 134
manual slidable latch 136
first end 138
second end 140

What is claimed is:

1. A camera for receiving a photographic filmstrip cartridge having a filmstrip wound around a filmstrip spool within a film cartridge housing, the cartridge housing having a first end and a second end with end openings through which the spool hub of said filmstrip spool is exposed, the camera comprising: a camera body enclosing a camera frame having a film supply cavity and a filmstrip transport path, and a film cartridge loading chamber pivotally movable between a deployed position for receiving said film cartridge loaded manually into an end opening thereof and a closed position wherein the film loading chamber is pivoted into said film supply cavity, is characterized by:

filmstrip drive means for engaging said filmstrip spool hub when said loading chamber is moved to said closed position and providing a first locator;

latch means for latching said loading chamber in said closed position upon pivotal movement of said loading chamber into said film supply cavity; and second locator means coupled with said latch means for engaging said filmstrip spool hub at said cartridge second end at a second locator to align said filmstrip along an axis in parallel with respect to said film transport path, wherein said latch means further comprises:

means coupled with said film loading chamber for providing a latch slot;

a movable plate attached for movement with respect to said camera frame from an extended position and an engaged position;

a latch pin mounted to extend from said movable plate; and means for effecting movement of said movable plate between said extended and engaged positions for engaging said latch pin in said latch slot in said engaged position and for spacing said latch pin out of said latch slot in said extended position.

2. The camera of claim 1, wherein said second locator means comprises a locator pin mounted to extend from said movable plate in alignment with said first locator; and said movement effecting means effects movement of said locator pin into said filmstrip spool hub at said cartridge second end upon movement of said latch pin into said latch slot in said engaged position of said movable plate to align said filmstrip spool along an axis parallel to said film transport path and effects movement of said locator pin out of said filmstrip spool hub at said cartridge second end upon movement of said latch pin out of said latch slot in said extended position of said movable plate.

3. The camera of claim 2, wherein said film cartridge includes a cartridge door movable on a door hub between an open position for advancing filmstrip onto or from said filmstrip spool and a closed position for enclosing said filmstrip entirely within said cartridge, and having door hub locator means for engaging said door hub and for aligning said door opening with said filmstrip transport path upon seating said film cartridge in said film cartridge loading chamber and movement into said closed position.

4. The camera of claim 3, wherein said door hub locator means includes door driver means attached to an end of said film loading chamber for engaging said door hub and aligning said door opening with said filmstrip transport path, said door driver means biased into a first position effecting closure of the film cartridge door and movable to a second position to open said film cartridge door; and door driver actuator means for engaging and moving said door driver means between said first and said second positions on movement of said movable plate between said extended and engaged positions, respectively.

5. A camera for receiving a photographic filmstrip cartridge having a filmstrip wound around a filmstrip spool within a film cartridge housing, the cartridge housing having a first end and a second end with end openings through which the spool hub of said filmstrip spool is exposed, the camera comprising: a camera body enclosing a camera frame having a film supply cavity and a filmstrip transport path, and a film cartridge loading chamber pivotally movable between a deployed position for receiving said film cartridge loaded manually into an end opening thereof and a closed position wherein the film loading chamber is pivoted into said film supply cavity and characterized in that:

said camera includes filmstrip drive means for engaging said filmstrip spool hub when said loading chamber is moved to said closed position and providing a first locator;

latch means for latching said loading chamber in said closed position upon pivotal movement of said loading chamber into said film supply cavity; and second locator means coupled with said latch means for engaging said filmstrip spool hub at said cartridge second end at a second locator to align said filmstrip along an axis in parallel with respect to said film transport path, wherein said film cartridge has a cartridge door movable on a door hub between an open position for advancing filmstrip onto or from said filmstrip spool and a closed position for enclosing said filmstrip entirely within said cartridge, said camera having:

door hub locating feature means for engaging said door hub and for aligning said door opening with said filmstrip transport path upon seating said film cartridge in said film cartridge loading chamber and movement into said closed position.

6. The camera of claim 5, wherein said door hub locating feature means includes door driver means attached to an end of said film loading chamber for engaging said door hub and aligning said door opening with said filmstrip transport path, said door driver means biased into a first position effecting closure of the film cartridge door and movable to a second position to open said film cartridge door; and door driver actuator means for engaging and moving said door driver means between said first and said second positions on movement of said film loading chamber between said deployed and closed positions, respectively.

7. In a camera having a film transport path and a film supply cavity in a camera frame for receiving a photographic filmstrip cartridge having a filmstrip wound around a filmstrip spool within a cartridge housing, said cartridge housing having a seated end and a free end with end openings through which the spool hub of said filmstrip spool is exposed, a film door covering a door opening extending between said seated and free ends and pivotal on a door opening hub between a door open and a door closed position, said camera defining locators for engaging and securing said film cartridge at a defined alignment position with respect to said film transport path characterized by:

said camera having a film cartridge loading chamber pivotally movable between a deployed position for receiving said film cartridge loaded manually, seated end first, into an end opening thereof and a closed position within said film supply cavity in alignment with said film transport path;

filmstrip drive means for engaging said filmstrip spool hub at said cartridge seated end and defining a first locator upon movement of said loading chamber to said closed position to enable advancement and retraction of said filmstrip through said door opening;

latch means for latching said loading chamber in said closed position upon pivotal movement of said loading chamber into said film supply cavity and providing a reference point when latched;

second locator means coupled with said latch means for engaging said filmstrip spool hub at said cartridge free end defining a second locator when engaged upon movement of said film loading chamber into said closed position; and cartridge door driver means associated with said film loading chamber for engaging said door driver hub and opening said film door when said cartridge is loaded into said film loading chamber and defining a third locator, whereby upon closing of said film loading chamber, said filmstrip is aligned with said film transport path.

8. The camera of claim 7, wherein said door driver means includes means for attaching said door driver means to the seated end of said film loading chamber and for biasing said film cartridge door into a first position effecting closure of the film cartridge door and movable to a second position to open said film cartridge door; and cartridge door driver actuator means for engaging and moving said door driver means between said first and said second positions on movement of said film loading chamber between said deployed and closed positions, respectively.

9. The camera of claim 8, wherein said latch means includes means coupled with said film loading chamber for providing a latch slot;

a movable plate attached for movement with respect to said camera frame from an extended position and an engaged position;

a latch pin mounted to extend from said movable plate and providing said reference point; and means for effecting movement of said movable plate between said extended and engaged positions for engaging said latch pin in said latch slot in said engaged position and for spacing said latch pin out of said latch slot in said extended position.

10. The camera of claim 9, wherein said second locator comprises a locator pin mounted to extend from said movable plate in alignment with said first locator; and said movement effecting means effects movement of said locator pin into said filmstrip spool hub at said cartridge free end upon movement of said latch pin into said latch slot in said engaged position of said movable plate to align said filmstrip spool along an axis parallel with respect to said film transport path and effects movement of said locator pin out of said filmstrip spool hub at said cartridge free end upon movement of said latch pin out of said latch slot in said extended position of said movable plate.

11. The camera of claim 7, wherein said latch means includes means coupled with said film loading chamber for providing a latch slot;

a movable plate attached for movement with respect to said camera frame from an extended position and an engaged position;

a latch pin mounted to extend from said movable plate and providing said reference point; and means for effecting movement of said movable plate between said extended and engaged positions for engaging said latch pin in said latch slot in said engaged position and for spacing said latch pin out of said latch slot in said extended position.

12. The camera of claim 11, wherein said second locator comprises a locator pin mounted to extend from said movable plate in alignment with said first locator; and said movement effecting means effects movement of said locator pin into said filmstrip spool hub at said cartridge free end upon movement of said latch pin into said latch slot in said engaged position of said movable plate to align said filmstrip spool along an axis in parallel with respect to said film transport path and effects movement of said locator pin out of said filmstrip spool hub at said cartridge free end upon movement of said latch pin out of said latch slot in said extended position of said movable plate.

\* \* \* \* \*